[illegible] Filed [illegible]

[illegible]

Making [illegible]

6-14-1834

CLASSIFICATION 8244 X DIVISION

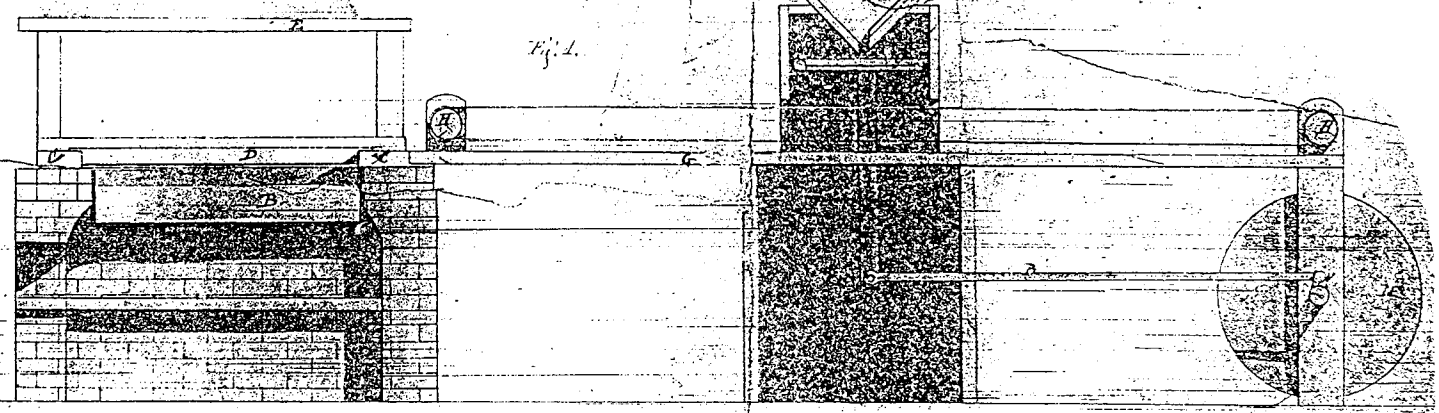

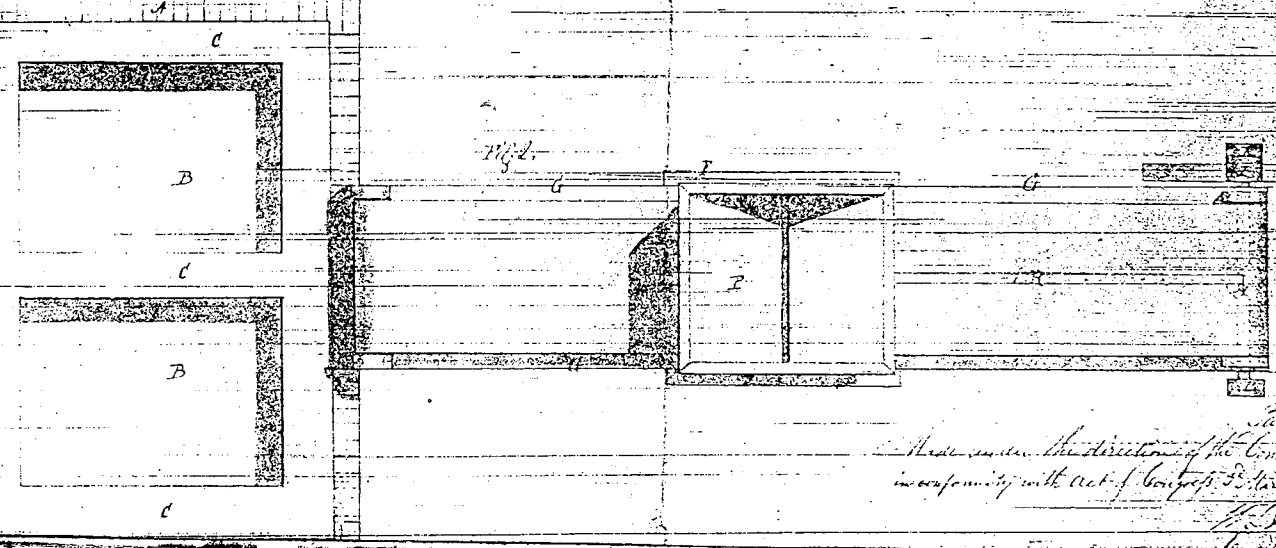

References

Fig. 1. vertical section,
Fig. 2. top view,
A brick arches B. kettles,
C. curbs. D. size boards,
E stand for paper (omitted in Fig 2)
F. wooden case in rear of arch,
G. platform H. H. feeding rollers.
I. K. tight and loose pulley. L. driving pulley. M. flywheel. N. crank. O. [illegible]
P. hopper. Q. vertical lever. R. connecting rod Patent Office Copy
Made under the direction of the Commissioner of Patents in conformity with Act of Congress 3d March 1837.
[illegible]
Commissioner [illegible]

8244x June 14. 1834

Isaac Fisher Junr of Springfield; Vermont

Letters Patent

The Schedule referred to in these Letters Patent and making part of the same containing a description in the words of the said Isaac Fisher Jr himself of his improvement in making glass or sand paper so called To all to whom these presents shall come Be it known, that I. Isaac Fisher Jr of Springfield in the County of Windsor and State of Vermont, have invented a new and useful improvement in making glass or sand paper so called, and that the following is a full and exact description of the same as invented by me.

Take Quartz in the stone or Rock, and pound the same in any convenient manner, into pieces sufficiently small for grinding. then have the same ground in a granite or Burr mill, and bolted into powder and grains of any desirable fineness. The powder or grains thus obtained from the Quartz, without being calcined, may be used in the manufacture of Glass, or Sand paper aforesaid in lieu of Glass, or natural sand, or any calcined stone. The said Fisher claims the invention of using Quartz pulverized or ground from the stone or Rock without calcination in the manufacture of sand or glass paper so called, in lieu of natural sand, ground, or pulverized glass or any calcined stone, as being superior from having better defined angles, and not being so liable to break.

Isaac Fisher Junr

Witness
Hamlin Whitmore
Saml. W. Porter

Drawing (252 Words)

(Granted June 14. 1834.)